Figure 1:
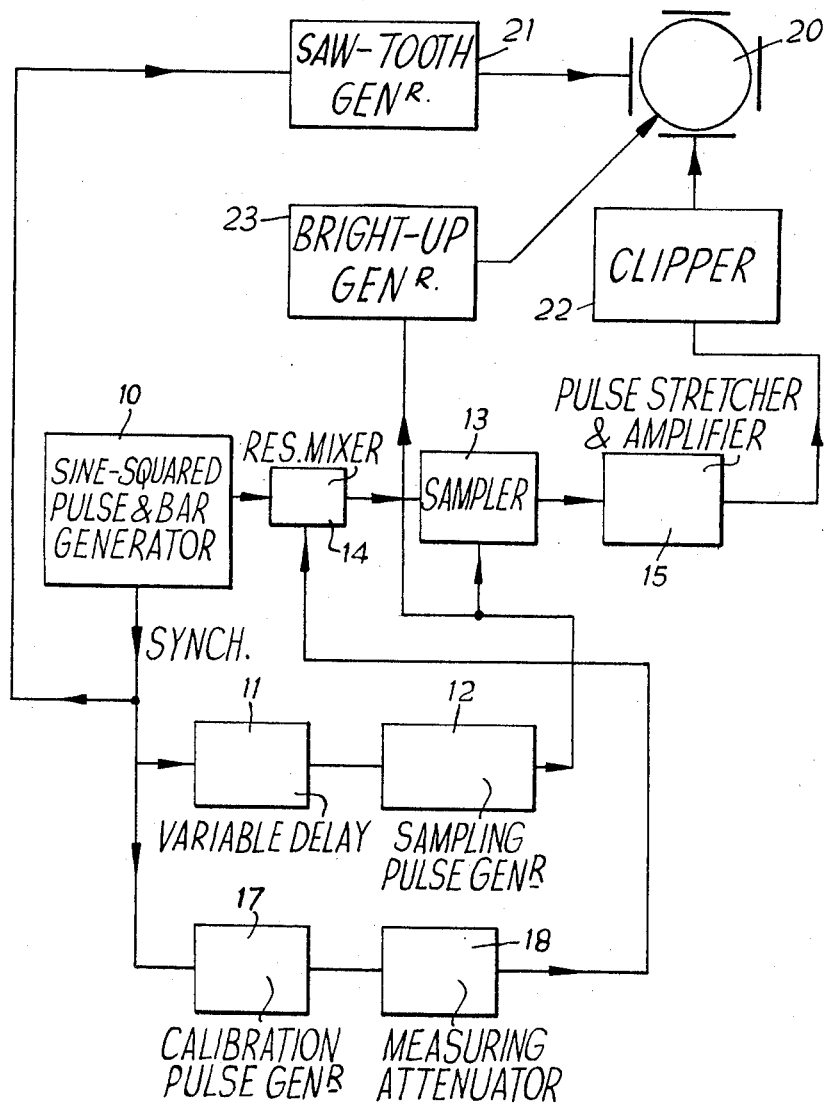

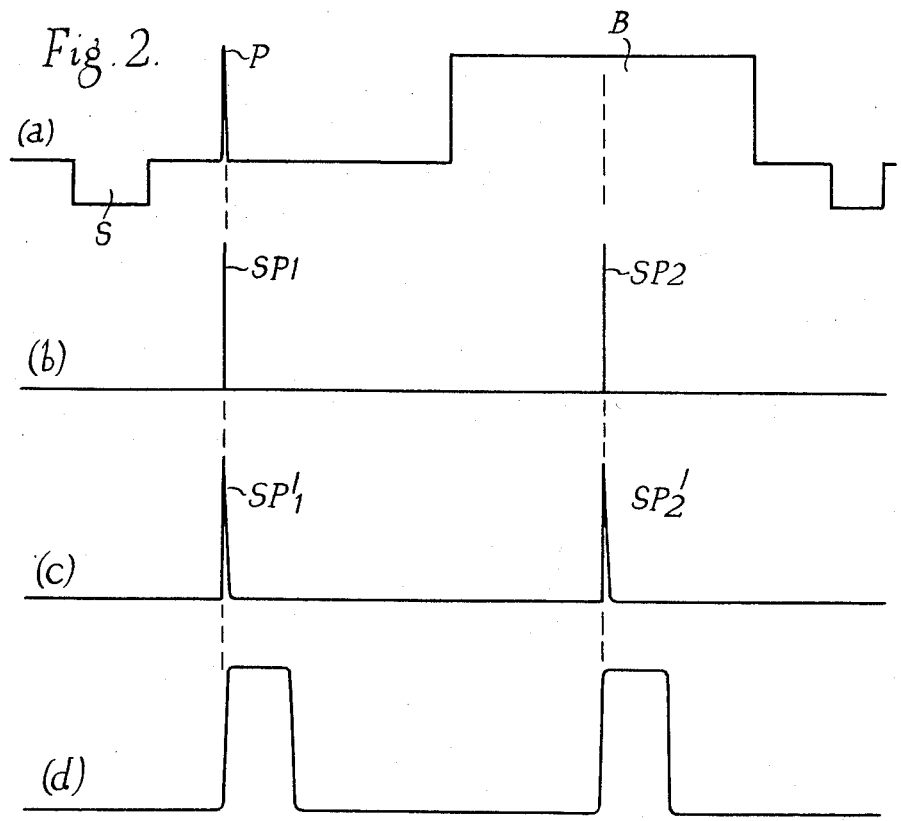
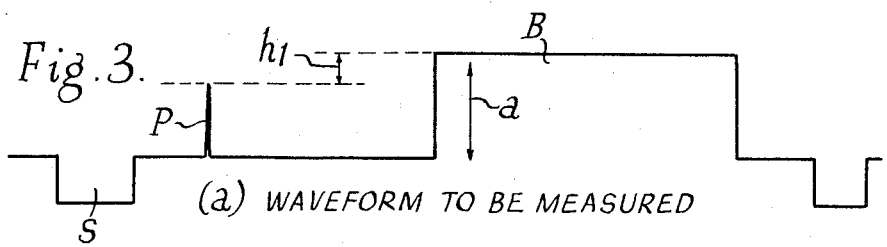
(a) WAVEFORM TO BE MEASURED
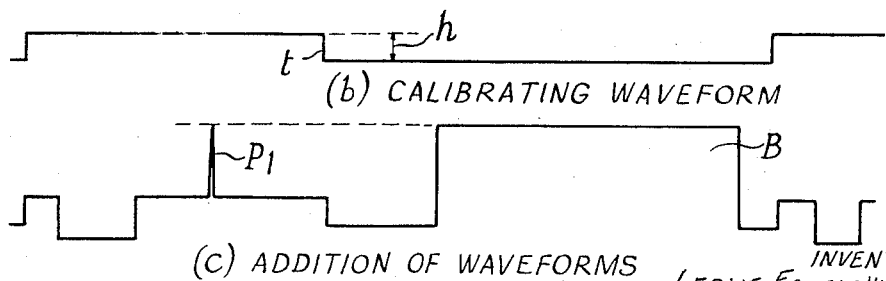
(b) CALIBRATING WAVEFORM
(c) ADDITION OF WAVEFORMS

3,250,993
APPARATUS AND METHOD FOR MEASURING AMPLITUDES AT SELECTED POINTS IN RECURRENT ELECTRICAL SIGNAL WAVEFORMS

Leslie Ernest Weaver, Orpington, Kent, England, assignor to Marconi's Wireless Telegraph Company Limited, and Standard Telephones & Cables Limited, both of London, England, both British companies
Filed Apr. 30, 1962, Ser. No. 191,225
Claims priority, application Great Britain, May 3, 1961, 16,064/61
6 Claims. (Cl. 324—77)

The present invention relates to apparatus for measuring amplitudes at selected points in recurrent electrical signal waveforms, and particularly, although not exclusively, to the measurement of pulse-to-bar ratios when testing the performance of television equipment. In such measurements use is made of a test signal in the form of a recurrent waveform consisting of a "sine-squared" shaped pulse and a "bar" in the form of a square pulse of duration long compared with that of the sine-squared pulse. Such waveforms are discussed in a paper, "Waveform Responses of Television Links," by N. W. Lewis, published in the Proceedings of the Institution of Electrical Engineers, volume 101, Part III, page 258.

Such a waveform is shown, with a synchronising pulse, in FIG. 2(a) of the accompanying drawings.

The synchronising pulse is shown at S, the sine-squared pulse at P and the bar at B. For testing 405-line television equipment the bar may have a duration of 40 microseconds. The peak amplitude of the pulse P is equal to the constant amplitude of the bar B and the transitions follow, with a high degree of accuracy, a predetermined shape.

The accuracy of the transitions is ensured by the following means. The output pulse and bar signals are derived by passing both a close approximation to a unit impulse (Dirac function) and a close approximation to an ideal bar with infinitely fast transitions through a precision network known, from its designer, as a Thomson network (as described in a paper by W. E. Thomson entitled, "The Synthesis of a Network To Have a Sine-Squared Impulse Response," published in the Proceedings of the Institution of Electrical Engineers, volume 99, Part III, page 373). As a result, the shape of the output waveform is determined by the characteristics of the network, and is practically independent of reasonable variations in the input signals. The closeness of the approximation is, apart from factors such as the flatness of the top of the bar, determined by the shortness of the duration of the transitions at the input compared with those at the output.

The resulting signal is then used as a standard test signal for the assessment of the distortion introduced by apparatus intended to handle television-type signals. For example, since the shape of the input pulse to the apparatus under test is accurately known, the output pulse may be compared with a standard graticule in order to estimate the distortion introduced, provided the display device can be considered as distortionless over the frequency band concerned.

The presence of the bar assists in the measurement of relatively low-frequency distortions, but additionally it makes possible a very simple and sensitive check on the effective bandwidth of the system. Suppose, for example, that the bandwidth of the system under test is restricted somewhat, over the range of frequencies to be tested by the waveform, and that initially the peak amplitude of the pulse has been made accurately equal to the amplitude at the centre of the bar. The principal effect of this reduction in bandwidth is an increase in the times of rise or fall of the waveforms at the output of the system. This will result in a reduction of the peak amplitude of the pulse, since its transition time originally corresponded exactly to the nominal bandwidth of the system, but the amplitude of the bar will remain unchanged. The reason for this is that the change in transition time affects the width of the bar to a quite negligible extent, and thus leaves the height of the flat portion unchanged, whereas the pulse no longer has time to rise to its original peak amplitude before being constrained to fall again.

This property is of the highest importance, and the measured output pulse-to-bar ratio forms one of the fundamental parameters used in the assessment of the quality of the apparatus under test; the other parameters are derived from a measurement against a standard graticule of the amount of waveform distortion of both the pulse and the bar components of the test signal.

Since, in general, only one terminal of the equipment under test is available at any given moment, as the equipment may include circuits such as coaxial cable and radio links, the success of the method depends upon two factors: the accuracy of the pulse and bar waveforms and the accurate adjustment of the pulse-to-bar ratio to unity at the input of the system.

The first factor is taken care of by the fact that the test waveforms have their precise shapes determined by the Thomson network, which is very accurately aligned initially and furthermore is constructed in such a fashion as to maintain its characteristics with a very high degree of stability. It is not easy to find waveform monitors with a sufficiently high and stable standard of performance to check these waveforms as they are delivered by the generator, but there exists, fortunately, a factor of safety. If the observed output waveform does not agree with the specification, either the waveform generator or the monitor, or both, must be faulty. Steps can then be taken to find which is responsible by a process of elimination or by calling upon instruments which are kept as standards of reference.

Very unfortunately, this safety factor does not exist in the case of the pulse-to-bar ratio. Although a great deal of pains may be taken in the design of the generator to ensure that the pulse-to-bar ratio varies as little as possible, a certain amount of variation is inevitable, and in addition the possibilities remain of maladjustment or faulty operation. It is also unfortunately the case that very significant errors in the pulse-to-bar ratio due to the display means can occur, even when the displayed pulse waveform appears to be impeccable. Certain very specialised and expensive types of monitor are available as references, but even these have to be checked at intervals by laboratory techniques.

If a waveform monitor having such an error is used to check and adjust a sine-squared pulse and bar generator, the pulse-to-bar ratio of the signal fed to the apparatus under test will be set at the wrong value, with no available indication that anything is amiss. This error will then be transferred to the readings taken at the output of the system.

It might be supposed that this difficulty could be overcome by testing the waveform monitors with a frequency sweep, but experience has shown that this is not sufficiently reliable. On the one hand certain amplitude errors occur in all frequency sweeps, so that an observed irregularity in the response cannot be assigned positively to the waveform monitor. On the other hand, certain small irregularities in the response are endemic with a number of types of waveform monitor, particularly those which incorporate delay lines or distributed amplifiers, although these may not necessarily be significant. It is a basic feature of this method of test, and indeed is one of its great advantages, that an error in the response of the apparatus under test is taken into account only to the extent that it would affect the subjective appreciation of a television picture signal. Thus, one response error which is hardly perceptible on the sweep signal may be regarded as significant according to a sine-squared pulse and bar test, whereas another apparently larger error may be regarded as of negligible importance.

The present invention has for one of its objects to provide relatively inexpensive apparatus by means of which highly accurate measurements of pulse-to-bar ratios can be made.

According to the present invention there is provided apparatus for comparing the amplitudes at selected points in a recurrent electrical signal waveform comprising means for applying pulses to sample the waveform at the selected points, using sampling pulses of duration small in comparison with the duration of the waveform, means for increasing the duration of the pulses constituting the samples, without substantially changing the amplitude ratio thereof, and means for comparing the amplitudes of the pulses of increased duration.

When the waveform is a sine-squared pulse and bar signal, the sampling pulses are made of duration substantially less than that of the sine-squared pulses.

The pulses of increased duration may, for example, be compared by producing from them a visible display which can be measured. Alternatively the earlier pulse may be delayed by the time interval between the pulses and the difference in amplitude may be measured by means of a bridge circuit or otherwise.

The invention will be described, by way of example, with reference to the accompanying drawing.

FIG. 1 is a block circuit diagram of one embodiment of the invention, and

FIGS. 2 and 3 contain waveforms arising in the circuit of FIG. 1.

The following description assumes that the test signal corresponds to that of a 405-line television system, but it will be evident that the invention is equally applicable to other line standards and to other recurrent waveforms.

Referring to FIG. 1, a sine-squared pulse and bar generator 10 generates a recurrent waveform as shown in FIG. 2($a$). Synchronising pulses S selected from this waveform are applied through a driving pulse generator device 11 introducing a variable time delay to a sampling pulse generator 12 which generates two sampling pulses $SP_1$ and $SP_2$ for each synchronising pulse, these pulses being accurately locked in time to the output of the device 11. The times of occurrence of the pulses $SP_1$ and $SP_2$ are made such that the first occurs at substantially the peak of the pulse P and the second occurs at approximately the centre of the bar pulse B. The spacing of the pulses $SP_1$ and $SP_2$ in this example is 50 microseconds, the bar B having a duration of 40 microseconds. The sampling pulses have a duration of a few nanoseconds (milli-microseconds) or less. These sampling pulses are applied to a sampler 13 to which are also applied signals of the waveform of FIG 2($a$) (with or without the synchronising pulses S) from the generator 10. Care is taken that the two sampling pulses are exactly alike; in particular that they have exactly the same amplitude and duration and that the coupling between the generator 12 and the sampler 13 does not increase their duration.

The sampler 13 may be regarded as a form of modulator or linear gate which may be balanced or unbalanced, as desired. It may be constructed from thermionic valves (either diodes or amplifying valves) but, preferably, uses high-frequency semiconductor diodes.

A suitable form of sampler operates as follows. Gating diodes are arranged to introduce a very large attenuation in series with the signal from 10 until a sampling pulse arrives. When this occurs the diodes open and an output signal appears for the duration of the sampling pulse. This output signal has an amplitude which is a function of the amplitude of the signal from 10 over the sampling interval. Although for measuring pulse-to-bar ratios by the method to be described it is not essential, if required it can be arranged that the amplitude of the output signal from the sampler 13 varies very linearly with the amplitude of the input signal.

The sampler 13 is arranged to provide an accurate termination to the generator 10 or to a resistive mixer 14 (the purpose of which will be described later) or other resistive network when a mixer is not required. Thus care is taken that no significant distortion can arise at this point.

The output of the sampler 13, shown in FIG. 2($c$), consists of pairs of short pulses $SP_1'$ and $SP_2'$, the amplitude of the first being proportional to the peak amplitude of the sine-squared pulse P. In order to ensure that this is so the variable delay device 11 is adjusted until the pulse $SP_1'$ has a maximum amplitude. The amplitude of the second pulse $SP_2'$ is proportional to the amplitude of the bar B.

The signal of FIG. 2($c$) from the output of the sampler 13 is fed to a pulse stretcher and amplifier 15 whose function is to increase the duration of the pulses while keeping their relative amplitudes unaltered. This may be accomplished, in known manner, by a combination of linear amplifying stages and passive networks, possibly with the addition of diodes. An example of the form the pulse stretcher and amplifier 15 might take is given in an article by J. J. Amodei entitled, "Converting Oscilloscopes for Fast Rise Time Sampling," which was published in Electronics, June 24, 1960. The output of the circuit 15 is indicated in FIG. 2($d$).

The increase in the duration of the pulses has the great advantage of reducing the bandwidth requirements of amplifiers and other equipment used to deal with the output of the sampler 13. This is made possible because the only information of interest carried by the pulses from the sampler is their amplitudes. A signal of adequate strength can thus be obtained from the output of the circuit 15 without the need for expensive wide-band equipment.

A further advantage of the invention is that a single sampler 13 is used, being operated by pulses from a single sampling pulse generator 12, triggered at different instants. Morover, when using a test signal waveform such as is shown in FIG. 2($a$) the two samples to be compared have nearly the same amplitude. Thus any error introduced by either component tends to be introduced in each sample.

In order to measure the pulse-to-bar ratio, various methods can be adopted. The simplest, illustrated in FIG. 1, is probably to display the waveform from the output of the circuit 15 on the screen of a suitable cathode ray tube monitor 20 against a graticule, the cathode ray beam being scanned in the X-coordinate by a saw-tooth wave generated in a saw-tooth generator 21 locked to the synchronising pulses S and the waveform from the output of the circuit 15 being applied to deflecting means deflecting the beam in the Y-coordinate.

It should be noticed that no great demands are made on this monitor. In the first place, since the difference between the pulse heights if such exists is normally quite small, non-linearity either in the display or in the vertical amplifier has only a second-order effect upon the accurcy. It follows that provided no actual limiting occurs, a considerable degree of amplification can be used to improve the accuracy. In the second place, the bandwidth of the pulses has been reduced from some hundreds or even thousands of mc./s. to a few hundreds of kc./s., which can be handled by any reasonable waveform monitor available.

In the case where the pulse-to-bar ratio is required to be set precisely to unity, the requirements are even less severe since the two pulses are then equal in all respects, and distortion is of comparatively little consequence since it affects both to the same degree. The one type of distortion to avoid is a frequency distortion such that the first pulse has a trailing-edge which interferes with the second and changes its amplitude, but this is unlikely.

In some cases it is required to measure accurately the pulse-to-bar ratio when this ratio differs from unity. One way of doing this will be described with reference to FIG. 1 and the waveform diagrams of FIG. 3.

A calibration pulse generator 17 is arranged to generate a rectangular waveform of the shape shown in FIG. 3(b) locked in frequency by means of the synchronising pulses S in the waveform of FIG.3(a) to be measured. This timing of the waveform of FIG. 3(b) is made such that the step or transition t is conveniently placed between the pulse P and the bar B of the waveform of FIG. 3(a). The output of the generator 17 is fed through a variable measuring attenuator 18 to the resistive mixer 14 connected between the generator 10 and the sampler 13, where it is added to the waveform of FIG. 3(a). The circuit is so arranged that this attenuator is correctly terminated.

A preliminary calibration is carried out by making the amplitude h of the step t at the output of the generator 17 exactly equal to the amplitude a of the bar B, which is carried out with the attenuator set to zero or some other convenient reference setting. The necessary adjustment of the generator 17 can be effected by the use of a simple comparison method with the aid of the waveform monitor already referred to.

The attenuator 18 is next so adjusted that the height $h$ of the step $t$ is equal to the difference $h_1$ between the amplitudes of the pulse P and the bar B. The waveform applied to the sampler 13 is then as shown in FIG. 3(c), the amplitude of the pulse $P_1$ being equal to that of the bar B. Consequently the output pulses from the sampler are equal in amplitude.

There is a substantial advantage in this equalisation of amplitudes since the output pulses are then equal in all respects and therefore are equally affected by almost every form of distortion, which consequently no longer influences the accuracy of measurement.

The method is thus a null method whatever may be the pulse-to-bar ratio, and the difference in the heights of the pulse and bar in terms of the bar height is given by the difference between the readings of the calibrated attenuator 18 during calibration and measurement.

It can be arranged that the polarity of the waveform of FIG. 3(b) can be inverted, when desired, in order to permit the measurement of ratios greater than unity.

Various methods are available for indicating when the condition of equality of output pulses has been achieved. In one application of the method described, illustrated in FIG. 1, the pairs of pulses of FIG. 2(d) may be clipped or "windowed" in a clipping circuit 22 so that only a region near their peaks is amplified and displayed on the cathode ray tube screen.

In another application of the method, also illustrated in FIG. 1, which can be used with or without the first-named application, narrow "bright-up" pulses are generated at 23 under the control of the sampling pulses from the generator 12 and these may be suitably delayed in time and applied to increase the intensity of the cathode ray beam from a low or negligible value. Thus the trace will be blacked out except for narrow regions around the central portions of the pulses of FIG. 2(d). When there is a difference between the amplitudes of the pulses of each pair and when a number of pairs of pulses are displayed simultaneously on the monitor screen, the display will take the form of a saw-tooth pattern of dots. This saw-tooth pattern will become a straight line when the amplitudes of the pulses are correctly adjusted to equality.

If desired, when using the last-described application the scan in the X-coordinates may be dispensed with. When the pulse amplitudes are unequal the display will then consist of a pair of dots spaced apart in the Y-coordinate and the two dots will be brought into co-incidence when the amplitudes are made equal.

Instead of displaying the pulses of FIG. 2(d) or parts thereof on a cathode ray tube screen, the earlier pulse may be selected by suitable gating means and delayed in time sufficiently to bring the two pulses into time coincidence. The difference in amplitude may then be measured by means of a bridge circuit, or otherwise.

A further method of indicating when the condition of equality of the output pulses from the output of the circuit 15 has been achieved may be obtained by the use of a closed-loop sampling system. This system is described in "Sampling Techniques Applied to High-Speed Pulse Oscillography," Mullard Technical Communications, volume 5, No. 48, in particular FIG. 56, page 323.

Very briefly, the sampling system operates in such a way as to make the bias on the sampling gate equal to the input potential at the instant of sampling, which it achieves by a negative feedback process. Once this state is reached, both the input bias voltage and the voltage in the output storage stage remain constant. If there is any difference between the two samples, the output will take the form of an approximately rectangular wave which can be amplified and used, either visually or on a meter, as a zero indication.

It is not essential that the two points in the waveform whose amplitude is to be compared should be sampled alternately as described. Thus, if desired, when the waveform is as shown in FIG. 2(a), the pulse P may be sampled a number of times over an interval $t_1$ milliseconds and the bar B may be sampled a number of times during an interval of $t_2$ milliseconds following the first-named interval. The intervals $t_1$ and $t_2$ may be equal or unequal and the sequence may be repeated indefinitely. The frequency of the output signal is then reduced and it is less important for the loop gain of the sampler to be nearly equal to unity.

The same sequence of sampling may also, if desired, be applied to the system described with reference to FIG. 1. The only change needed is the inclusion of an additional low-frequency gate which passes only pulses $SP_1$ during the recurrent intervals $t_1$ and only pulses $SP_2$ during the recurrent intervals $t_2$.

Care should, of course, be taken to ensure that the apparatus used is so designed that there is no possibility of any distortion occurring which could affect the measured values; for example, any "tilt" due to inadequate time-constants can cause serious errors. However, this should not present any serious difficulty in practice.

An error can arise in the measurement if the width of the sampling pulse used to sample the pulse P is not sufficiently narrow compared with the width of the pulse P. This is due to the fact that, when sampling the peak of the sine-squared pulse, the sampling pulse intercepts a region which is rounded, and hence its mean value is a little less than the true peak value. It can be shown that, if the gating pulse itself is assumed to have a sine-squared shape, which is not unreasonable, the ratio of the indicated amplitude to the true amplitude is not unity, but approximately $1-R^2/3$, where R is the ratio of the width of the sampling pulse to the width of the measured pulse. R is assumed to be quite small.

By way of example, the narrowest pulse likely to be measured for television purposes in Great Britain has a half-amplitude width of 100 nanoseconds (milli-microseconds) and, by the use of modern techniques, sampling pulses with a width of a few nanoseconds or less can be produced with quite simple circuitry. Hence the error from this cause can be made completely negligible.

In order to enable a circuit such as that of FIG. 1 to be used to compare the amplitude $a$ at any selected point in a waveform with that at a predetermined point, such as the centre of the bar B, the pulse generator 17 may be arranged to generate a relatively short bar (or rectangular pulse) and means are provided for varying the timing of this bar relatively to the waveform in a calibrated manner and simultaneously varying the timing of the first sampling pulse SP₁ by a like amount. This may be done, for example, by inserting a calibrated time delay device before the pulse generator 17 or between this pulse generator and the mixer 14. A second time delay device ganging to that just mentioned may be associated with the generator 12. The width of the narrow bar is not of importance provided that in all settings of its timing control it does not interfere with the amplitude of the added waveform, which is fed to the sampler 13, at the second sampling pulse.

If the signal from the generator 10 does not contain a synchronising pulse, some suitable external waveform may be used to lock the generator 10 to the sampling pulse generator 12 and, when used, to the calibration pulse generator 17. Alternatively a buffer amplifier may be connected between the pulse generator 10 and the sampler 13 and an independent output of the generator 10 may then be supplied to the variable delay device 11 in order to effect locking of the sampling pulse generator 12. This alternative is to be avoided when not necessary since it involves the introduction of a further device, namely the buffer amplifier, between the generator 10 and the sampler 13 and this further device may not be distortionless.

Instead of adding the calibration waveform to the waveform of FIG. 3(a), as described, it may be added to the waveform of FIG. 2(d), the transition $t$ occurring between the two pulses.

I claim:

1. A method of comparing the amplitudes at selected points in a recurrent electrical signal waveform which comprises a narrow pulse and a substantially rectangular bar pulse of duration substantially greater than that of said narrow pulse, said method comprising the steps of:
generating sampling pulses, said sampling pulses being each of duration substantially less than that of said narrow pulse, and which recur in groups of at least two at the same frequency as said recurrent signal waveform;
adjusting the phase of one of said sampling pulses to sample said bar;
and adjusting the phase of another of said sampling pulses to sample said narrow pulse at the point of maximum amplitude thereof, to provide pulses constituting samples;
increasing the duration of said pulses constituting samples, without substantially changing the amplitude ratio thereof;
and comparing the amplitudes of the pulses of increased duration.

2. A method according to claim 1 including the further steps of:
generating and adding to a portion of said recurrent signal waveform a substantially rectangular pulse, said portion of said recurrent signal waveform including only one of the two pulses constituted by said narrow pulse and said bar pulse;
and adjusting the amplitude of said rectangular pulse to make equal the amplitudes of the pulses constituting the samples.

3. A method according to claim 1 including the further steps of:
generating and adding to one of the pulses constituting the samples a substantially rectangular pulse;
and adjusting the amplitude of the rectangular pulse to make equal the amplitudes of the pulses constituting the samples.

4. Apparatus for comparing the amplitudes at selected points in a recurrent electrical signal waveform which comprises a narrow pulse and a substantially rectangular bar pulse of duration substantially greater than that of said narrow pulse, said apparatus comprising:
means for generating sampling pulses, said sampling pulses being each of duration substantially less than that of said narrow pulse, and recurring in groups of at least two at the same frequency as said recurrent signal waveform;
sampling means;
means for applying said sampling pulses to said sampling means to sample said bar pulse and said narrow pulse to provide pulses constituting samples;
means for adjusting the phase of said sampling pulses relative to said recurrent signal waveform to bring one of said sampling pulses into time coincidence with the point of maximum amplitude of said narrow pulse;
means for increasing the duration of said pulses constituting samples without substantially changing the amplitude ratio thereof, to provide pulses of increased duration;
means for delaying an earlier-occurring one of said pulses of increased duration by the time interval between said earlier-occurring pulse and a later occurring one of said pulses of increased duration to produce two pulses coincident in time; and means for measuring the difference in amplitude between the coincident pulses.

5. Apparatus for comparing the amplitudes at selected points in a recurrent electrical signal waveform which comprises a narrow pulse and a substantially rectangular bar pulse of duration substantially greater than that of said narrow pulse, said apparatus comprising:
means for generating sampling pulses, said sampling pulses being each of duration substantially less than that of said narrow pulse, and recurring in groups of at least two at the same frequency as said recurrent signal waveform;
sampling means;
means for applying said sampling pulses to said sampling means to sample said bar pulse and said narrow pulse to provide pulses constituting samples;
means for adjusting the phase of said sampling pulses relative to said recurrent signal waveform to bring one of said sampling pulses into time coincidence with the point of maximum amplitude of said narrow pulse;
means for increasing the duration of said pulses constituting samples without substantially changing the amplitude ratio thereof, to provide pulses of increased duration;
means for generating and adding to a portion of said recurrent signal waveform a substantially rectangular pulse, said portion of said recurrent signal waveform including only one of the two pulses constituted by said narrow pulse and said bar pulse, means for varying the amplitude of said rectangular pulse, said last-mentioned means permitting the amplitudes of the pulses constituting the samples to be made equal; and
means for comparing the amplitudes of the pulses of increased duration.

6. Apparatus for comparing the amplitudes at selected points in a recurrent electrical signal waveform which comprises a narrow pulse and a substantially rectangular bar pulse of duration substantially greater than that of said narrow pulse, said apparatus comprising:
means for generating sampling pulses, said sampling pulses being each of duration substantially less than that of said narrow pulse, and recurring in groups of at least two at the same frequency as said recurrent signal waveform;
sampling means;
means for applying said sampling pulses to said sampling means to sample said bar pulse and said narrow pulse to provide pulses constituting samples;
means for adjusting the phase of said sampling pulses relative to said recurrent signal waveform to bring one of said sampling pulses into time coincidence with the point of maximum amplitude of said narrow pulse;
means for increasing the duration of said pulses constituting samples without substantially changing the amplitude ratio thereof, to provide pulses of increased duration;

means for generating and adding to one of the pulses constituting the samples a substantially rectangular pulse, means for varying the amplitude of the rectangular pulse, said last-mentioned means permitting the amplitudes of the pulses of increased duration to be made equal; and means for comparing the amplitude of the pulses of increased duration.

References Cited by the Examiner

UNITED STATES PATENTS

| | | | |
|---|---|---|---|
| 2,522,367 | 9/1950 | Guanella. | |
| 2,591,738 | 4/1952 | Spencer | 324—102 |
| 2,733,358 | 1/1956 | Carapellotti. | |
| 2,820,896 | 1/1958 | Russell et al. | 324—148 X |
| 2,951,181 | 8/1960 | Sugarman | 324—77 X |
| 3,034,048 | 5/1962 | Rogers | 328—151 X |
| 3,124,746 | 3/1964 | Strathman | 324—77 |

FOREIGN PATENTS 659,862  10/1951  Great Britain.

WALTER L. CARLSON, *Primary Examiner.*

A. E. RICHMOND, *Assistant Examiner.*